(12) United States Patent
Choi et al.

(10) Patent No.: US 7,744,754 B2
(45) Date of Patent: Jun. 29, 2010

(54) PLANT FOR WASTEWATER TREATMENT

(75) Inventors: Hong-Bok Choi, Seoul (KR); Jae-Ki Lee, Seoul (KR); Ju-Hyung Park, Seoul (KR); Eun-Ju Choi, Seoul (KR); Jung-Rae Kim, Seoul (KR)

(73) Assignee: Ecodays Co., Ltd., Nowon-gu, Seoul (KR)

( * ) Notice: Subject to any disclaimer, the term of this patent is extended or adjusted under 35 U.S.C. 154(b) by 0 days.

(21) Appl. No.: 12/067,121

(22) PCT Filed: Sep. 14, 2006

(86) PCT No.: PCT/KR2006/003663

§ 371 (c)(1),
(2), (4) Date: Jul. 8, 2008

(87) PCT Pub. No.: WO2007/052895

PCT Pub. Date: May 10, 2007

(65) Prior Publication Data

US 2008/0264844 A1  Oct. 30, 2008

(30) Foreign Application Priority Data

Sep. 16, 2005 (KR) ...................... 10-2005-0086725

(51) Int. Cl.
*C02F 3/06* (2006.01)
(52) U.S. Cl. .................. 210/150; 210/188; 210/615
(58) Field of Classification Search ................. 210/150, 210/151, 188, 615, 617
See application file for complete search history.

(56) References Cited

U.S. PATENT DOCUMENTS

| | | | | |
|---|---|---|---|---|
| 4,422,930 A * | 12/1983 | Hatanaka | ................ | 210/150 |
| 4,618,418 A * | 10/1986 | Heijnen et al. | ............... | 210/151 |
| 4,931,401 A * | 6/1990 | Safi | ............................. | 210/150 |
| 5,019,268 A * | 5/1991 | Rogalla | ..................... | 210/617 |
| 5,298,164 A * | 3/1994 | Hapach et al. | ............... | 210/615 |
| 5,399,266 A * | 3/1995 | Hasegawa et al. | ........... | 210/150 |
| 5,718,823 A * | 2/1998 | Tomita et al. | ............... | 210/150 |
| 5,833,857 A * | 11/1998 | Roth | .......................... | 210/150 |
| 5,972,212 A * | 10/1999 | Hongo | ....................... | 210/150 |
| 6,478,963 B1 * | 11/2002 | Rossmanith | ................ | 210/188 |
| 6,682,653 B2 * | 1/2004 | Chuang et al. | .............. | 210/150 |
| 6,808,631 B2 * | 10/2004 | Paloheimo | .................. | 210/615 |
| 7,410,570 B2 * | 8/2008 | You et al. | .................... | 210/188 |
| 2007/0289921 A1 * | 12/2007 | Choi et al. | .................. | 210/151 |
| 2008/0264840 A1 * | 10/2008 | Choi | .......................... | 210/151 |

FOREIGN PATENT DOCUMENTS

| | | |
|---|---|---|
| JP | 10-118473 | 5/1998 |
| KR | 10-1999-0046806 | 7/1999 |
| KR | 10-2004-0064579 | 7/2004 |

* cited by examiner

Primary Examiner—Christopher Upton (57) ABSTRACT

A plant for wastewater treatment is provided by an exemplary embodiment of the present invention. The plant for wastewater treatment includes a reactor into which wastewater and air flow into and depart from; multi-layer sludge separating portions, wherein pollutants in wastewater can be decomposed by increasing an amount of dissolved oxygen because upward moving time of intruded wastewater and air bubbles can be increased by including a reactor divided into upper and lower sides, and fluidity of wastewater may be improved by forming a residential space; and carriers located between the sludge separating portions and including a large amount of microbes, wherein wastewater treatment is performed by a biological reaction caused by contact between the carriers and wastewater.

11 Claims, 6 Drawing Sheets

PLANT FOR WASTEWATER TREATMENT

TECHNICAL FIELD

The present invention relates to a plant for wastewater treatment. More particularly, the present invention relates to a plant for wastewater treatment, where wastewater may be efficiently treated by a biological reaction which is caused by passing wastewater through multi-layer sludge-separating portions having microbial carriers in a reactor.

BACKGROUND ART

Generally, wastewater treatment is a process that stabilizes polluted materials in water by a microbial or chemical oxidation-reduction reaction and separates untreated residual materials.

In other words, wastewater treatment is a process that stabilizes and separates properties of the water quality, organic materials, and nutritional materials by various methods. Currently, wastewater treatment is mostly performed by a biological method, and the cost for wastewater treatment is relatively inexpensive.

Such biological wastewater treatment is a method that purifies wastewater by contacting wastewater with carriers having a large amount of microbes.

However, such a conventional biological wastewater treatment may have the following problems.

Firstly, a lot of additional energy is required for raising standard oxygen transfer efficiency (SOTE) because biological wastewater treatment has low standard oxygen transfer efficiency (SOTE).

Secondly, a large-volume reactor is necessary for a conventional biological wastewater treatment because a large amount of microbes should be returned due to losses of microbes in a reactor and inflow amounts of microbes are not as much as returning amounts of microbes when microbes are returned.

Thirdly, decomposing abilities may be deteriorated because microbes of which activities are deteriorated during a precipitation process or which experience a sufficient growth period may flow into an aeration tank.

Fourthly, since fluidity of wastewater in a reactor is low, sludge may be accumulated around carriers after several operations of a plant for wastewater treatment, and an inner part of carriers may become anaerobic for the most part. Consequently, efficiency of a plant for wastewater treatment may be deteriorated.

Fifthly, oxygen dissolution, dissolved oxygen, and speed of mass transfer which is a speed that a substrate transfers to a microbe are low because linear velocity is low during movement of a fluid such as wastewater.

Sixthly, since a reactor is a complete mixture type, reaction induction is inevitable at a low concentration. Accordingly, speed for treating wastewater is low and highly efficient reaction is hard to be obtained at a low concentration.

Seventhly, since a reactor contains the same material, various kinds of microbes are hard to be obtained.

DISCLOSURE OF INVENTION

Technical Problem

The present invention has been made in an effort to provide a biological plant for wastewater treatment having an advantage of improving standard oxygen transfer efficiency (SOTE) by using multi-layer carriers containing biological microbes and by increasing fluidity of fluid.

Another advantage provided by an exemplary embodiment of the present invention is that conventional sludge accumulation may be thoroughly eliminated because most biological films attached to carriers are maintained under an aerobic condition.

Another advantage provided by an exemplary embodiment of the present invention is that a proliferation rate of microbes can be maximized because speed of mass transfer can be improved by increasing linear velocity of fluid.

Another advantage provided by an exemplary embodiment of the present invention is that standard oxygen transfer efficiency (SOTE) may be improved by increasing residence time of air within a reactor and that removal of bad smell can be induced by increasing residence time of bad smell in wastewater.

Another advantage provided by an exemplary embodiment of the present invention is that processing time of a reactor can be shortened and overall efficiency of a reactor can be increased.

Another advantage provided by an exemplary embodiment of the present invention is that sludge accumulated in carriers can be easily removed by exhausting remaining air.

Another advantage provided by an exemplary embodiment of the present invention is that speed for treating wastewater can be increased by increasing the number and species of microbes through forming an air mass within a reactor and that processes for treating wastewater can be stably performed even under impact load.

Another advantage provided by an exemplary embodiment of the present invention is that irresoluble microbial by-products created during long-time processes can be reduced by shortening processing time and that the amount of sludge can be reduced by increasing oxidation speed due to sufficient dissolved oxygen.

Another advantage provided by an exemplary embodiment of the present invention is that since carriers are fixed within a reactor, loss of microbes can be prevented by minimizing microbes which are swept away during reactions.

Technical Solution

An exemplary embodiment of the present invention provides a biological plant for wastewater treatment including a reactor inflowing and exhausting wastewater and air and including multi-layer sludge separating portions, wherein pollutants in wastewater can be decomposed by increasing an amount of dissolved oxygen because upward moving time of intruded wastewater and air bubbles can be increased by including a reactor divided into upper and lower sides, and wherein fluidity of wastewater may be improved by forming a residential space.

Also, an exemplary embodiment of the present invention provides a biological plant for wastewater treatment including carriers located between the multi-layer sludge separating portions and having a large amount of microbes, wherein wastewater treatment is performed by a biological reaction caused by contact between carriers and wastewater.

Advantageous Effects

A biological plant for wastewater treatment according to an exemplary embodiment of the present invention may provide the following advantages.

Firstly, standard oxygen transfer efficiency (SOTE) can be improved by using multi-layer carriers containing biological microbes and by increasing fluidity of fluid. In addition, operating cost may be reduced because additional energy is not required for operating the biological plant for wastewater treatment according to an exemplary embodiment of the present invention.

Secondly, since a plurality of carriers are fixedly located in a reactor, loss of microbes can be prevented when wastewater contacts a plurality of carriers, and volume of a reactor can be reduced because additional microbes are not required by minimizing loss of microbes.

Thirdly, since a biological plant for wastewater treatment according to an exemplary embodiment of the present invention has an advantage of PFR wherein fluid can gradually move and it can simultaneously improve standard oxygen transfer efficiency (SOTE), it can provide efficiency for treating wastewater of five times more than a conventional plant for wastewater treatment.

Fourthly, conventional sludge accumulation may be thoroughly eliminated because most biological films attached to carriers are maintained under an aerobic condition.

Fifthly, a proliferation rate of microbes can be maximized because speed of mass transfer can be improved by increasing linear velocity of fluid due to fluidity of fluid.

Sixthly, standard oxygen transfer efficiency (SOTE) may be improved by increasing residence time of air within a reactor and removal of a bad smell can be induced by increasing residence time of the bad smell in wastewater.

Seventhly, since high-concentration organic materials, oxygen, and microbes contacts one another in the lower part of the reactor and low-concentration organic materials, oxygen, and microbes contacts one another in the upper part of the reactor, processing time of a reactor can be shortened by five times or more than a conventional activated sludge process for wastewater treatment. In addition, efficiency for treating wastewater can be improved by 95% or more.

Eighthly, although sludge may be accumulated in carriers, the sludge accumulated in carriers can be easily removed by exhausting remaining air.

Ninthly, since a lot of microbes and various species of microbes can be simultaneously maintained by forming various conditions on each sludge separating portion, speed for treating wastewater can be increased and processes for treating wastewater can be stably performed even under impact load.

Tenthly, irresoluble microbial by-products created during long-time processes can be reduced by shortening processing time, and the amount of sludge can be reduced by increasing oxidation speed due to sufficient dissolved oxygen.

Eleventhly, since carriers are fixed within a reactor, loss of microbes can be prevented by minimizing microbes that are swept away during reactions.

BEST MODE FOR CARRYING OUT THE INVENTION

A biological plant for wastewater treatment according to an exemplary embodiment of the present invention will hereinafter be described in detail with reference to the accompanying drawings.

Figure 1:
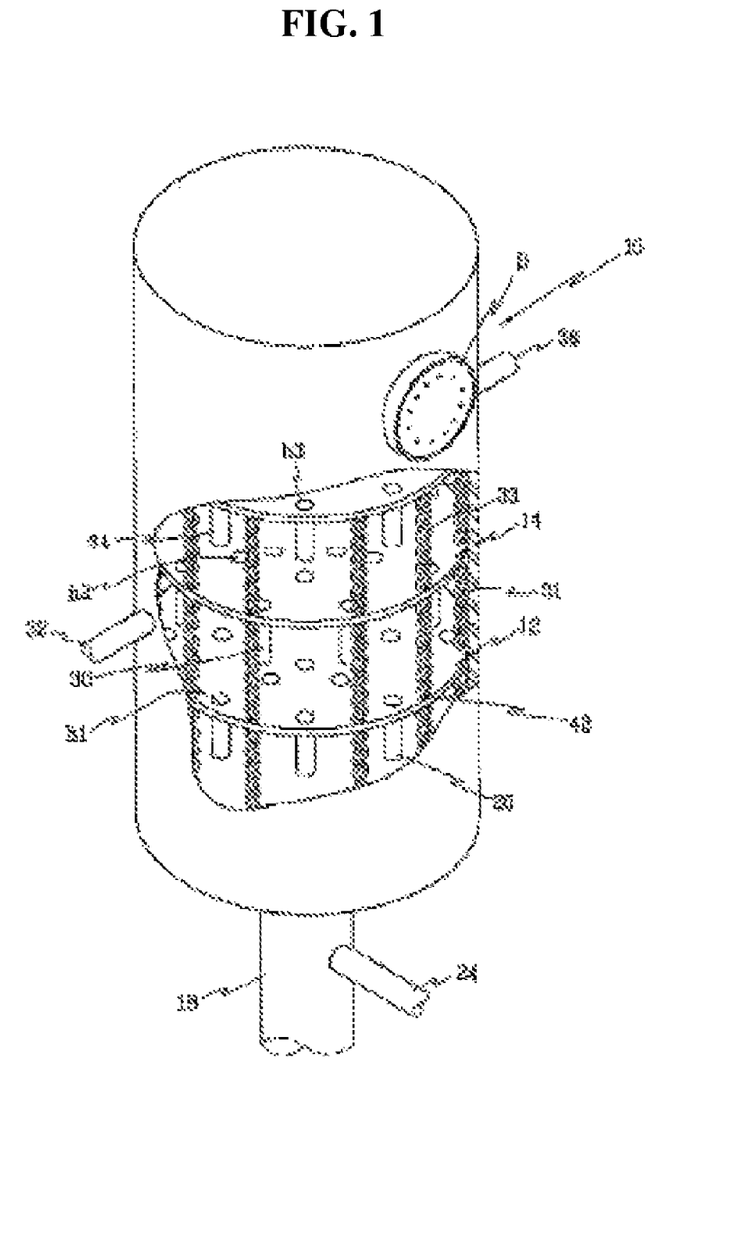
FIG. 1 is a perspective view showing a biological plant for wastewater treatment according to an exemplary embodiment of the present invention.
Figure 2:
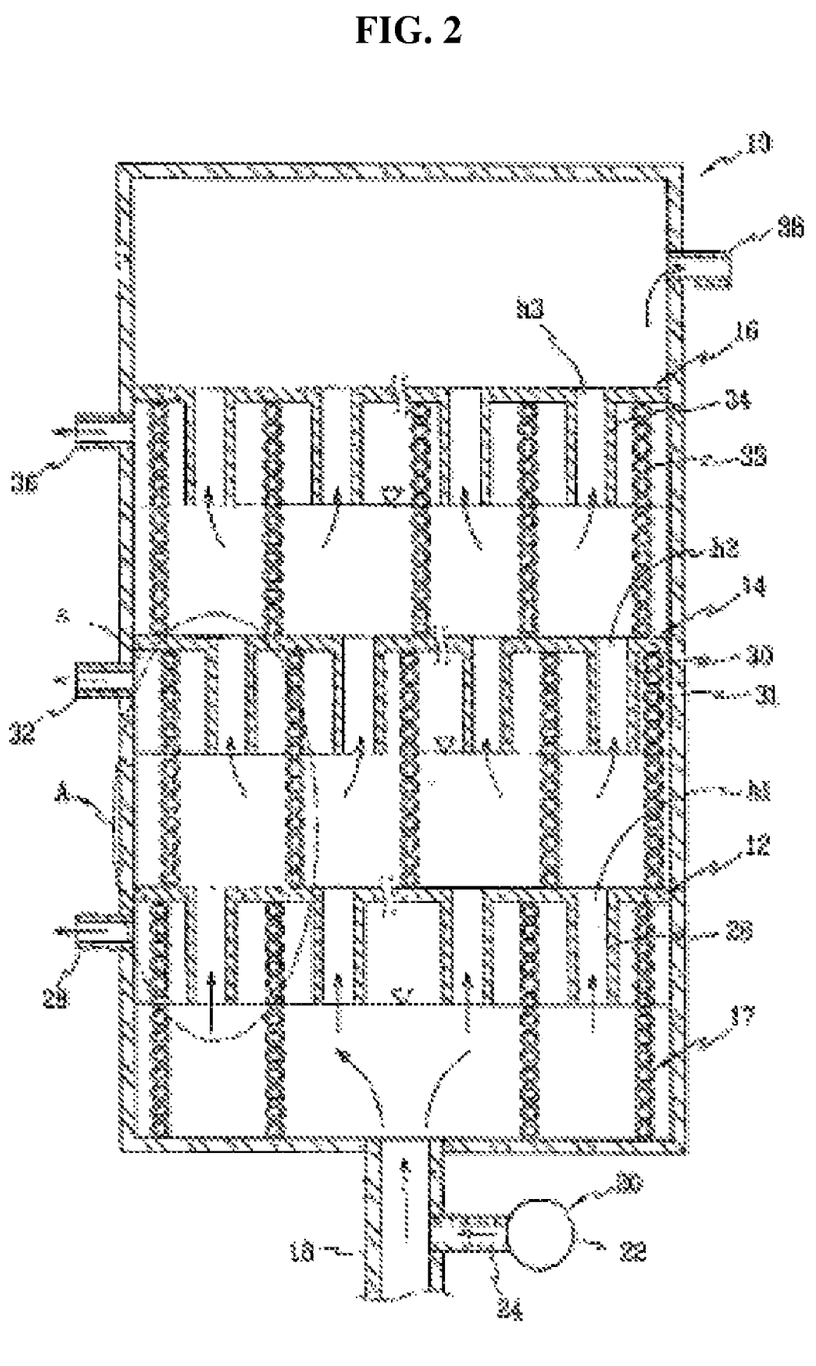
FIG. 2 is a cross-sectional side view illustrating a biological plant for wastewater treatment shown in FIG. 1.

FIG. 1 is a perspective view showing a biological plant for wastewater treatment according to an exemplary embodiment of the present invention, and FIG. 2 is a cross-sectional side view illustrating a biological plant for wastewater treatment shown in FIG. 1.

As shown in FIG. 1 and FIG. 2, an exemplary embodiment of the present invention provides a biological plant for wastewater treatment including a reactor 10 inflowing and exhausting wastewater and air, wherein pollutants in wastewater can be decomposed by increasing amount of dissolved oxygen since upward moving time of intruded wastewater and air bubbles can be increased by including the reactor 10 divided into upper and lower sides.

Also, an exemplary embodiment of the present invention provides a biological plant for wastewater treatment that includes multi-layer sludge separating portions 12, 14, and 16 wherein fluidity of wastewater may be improved by forming a residential space and which includes carriers 17, 31, and 33 located between the multi-layer sludge separating portions, wherein a biological reaction may occur when carriers having a large amount of microbes contact wastewater and accumulation of sludge may be prevented because the wastewater contacts surfaces of the carriers 17, 31, and 33.

The reactor 10 can store intruded wastewater and air because it has a barrel shape including a predetermined space thereinside.

Such wastewater and air can be supplied into the reactor 10 through a supply unit 20 that is located at a lower part of the reactor 10.

The supply unit 20 includes an inflow pipe for wastewater 18 and an inflow pipe for air 24.

The inflow pipe for air 24 can efficiently supply external air into the reactor 10 because it is connected to a ventilator 22.

Accordingly, wastewater that has flowed through the inflow pipe for wastewater 18 fills up the inside of the reactor 10 from the lower part of the reactor 10, and external air is supplied into the inside of the reactor 10 through the inflow pipe for air 24.

Although the lower part of the reactor 10 described above has a plain shape, it may have a hopper shape according to an exemplary embodiment of the present invention. In addition, air can be injected into the reactor 10 by using a diffuser other than the above-mentioned method. A diffuser may inject air into a reactor by dividing air into several different streams.

An escape pipe 38 included at an upper part of the reactor 10 may exhaust wastewater and air to the outside of the reactor 10 after treatment within the reactor 10.

The sludge separating portions 12, 14, and 16 include at least one sludge separating portion, and it may preferably include first to third sludge separating portions 12, 14, and 16.

Accordingly, wastewater and air supplied from the lower part of the reactor 10 may undergo biological treatment while they sequentially pass the multi-layer sludge separating portions 12, 14, and 16.

Since the first to third sludge separating portions 12, 14, and 16 have the same shape, only the second sludge separating portion 14 will be described in the following.

Figure 3:
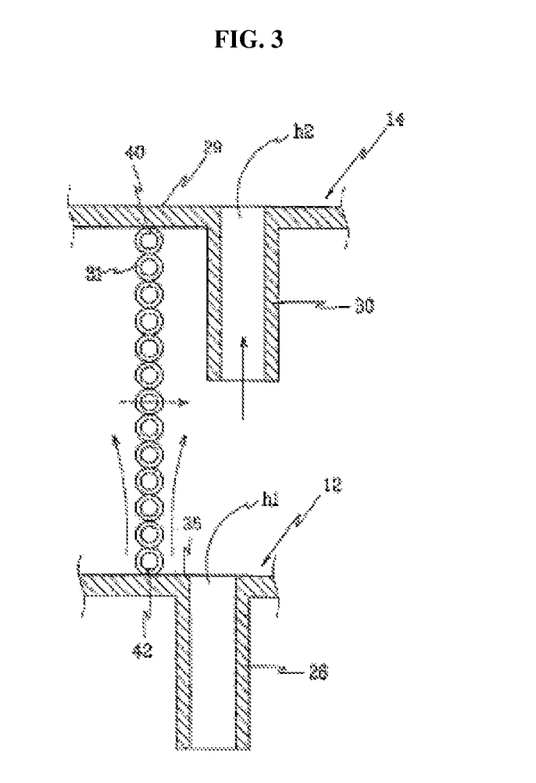
FIG. 3 is an enlarged perspective view showing the "A" part of FIG. 2.
Figure 4:
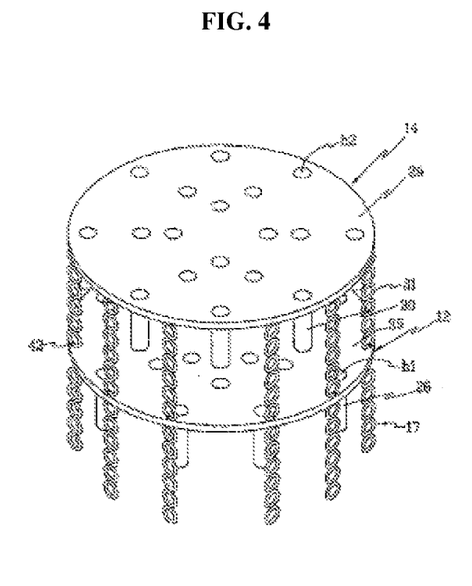
FIG. 4 is an enlarged view illustrating a sludge separating portion shown in FIG. 1.

As shown in FIG. 2 and FIG. 3, the second sludge separating portion 14 includes at least one plate 29 and a plurality of transferring pipes for fluid 30. The plate 29 divides the inside of the reactor 10 into the upper and lower parts and includes a plurality of through-holes h2. The transferring pipes for fluid 30 protruded downward are formed below the plate 29, and transfer wastewater and air.

Preferably, a plurality of through-holes h2 formed in the plate 29 may be dispersed uniformly in the plate 29. Since a plurality of through-holes h2 are uniformly dispersed in the plate 29, wastewater and air can also be uniformly dispersed.

In addition, a plurality of transferring pipes for fluid 30 have barrel shapes which include vacant spaces therein and connect to the through-holes h2.

Accordingly, as wastewater and air intruded by the transferring pipes for fluid 30 ascend, the amount of dissolved oxygen is increased because air is contained in the wastewater.

In addition, since a plurality of transferring pipes for fluid 30 formed below the plate 29 are protruded downward by a predetermined length and a surface of water is formed on the lower part of the transferring pipes for fluid 30, a plurality of residential spaces S for air having predetermined volumes are formed below the plate 29.

Accordingly, air ascending from the lower part of the reactor 10 is gathered in the residential space S, and the air is supplied into the transferring pipes for fluid 30 because it is dispersed all directions by pressure when it has gathered at more than a predetermined level.

Consequently, fluidity of wastewater can be improved because wastewater in the upper part of the reactor 10 drops into the lower part thereof in order to fulfill volume of air departed from the residential space S. Moreover, such fluidity of wastewater can be improved much more by the ascent of air.

Although the transferring pipe for fluid 30 described in the above has a shape of a usual pipe, the transferring pipe for fluid 30 according to an exemplary embodiment may have a funnel shape of which an upper area is formed more widely than a lower area thereof, or it may have an inverted funnel shape.

On the other hand, the carriers 17, 31, and 33 include a large amount of microbes, and they are located between sludge separating portions 12, 14, and 16.

Accordingly, when wastewater contacts the carriers 17, 31, and 33, it can be biologically treated by a biological reaction that occurs between the wastewater and microbes included in the carriers 17, 31, and 33

The carriers 17, 31, and 33 have shapes of several donuts arranged in a row, and they include a large amount of microbes. Although the carriers described in the above have donut shapes, the carriers according to an exemplary embodiment may have net shapes.

The first carrier 17 is located between the first sludge separating portion 12 and the bottom of the reactor 10, the second carrier 31 is located between the second sludge separating portion 14 and the first sludge separating portion 12, and the third carrier 33 is located between the third sludge separating portion 16 and the second sludge separating portion 14.

As shown in FIG. 3, the upper and lower ends of the first to third carriers 17, 31, and 33 are integrally connected to the plate 29 by welding or by brackets 40 and 42.

Therefore, the first to third carriers 17, 31, and 33 are vertically hung between the sludge separating portions 12, 14, and 16.

When wastewater ascends between the first to third carriers 17, 31, and 33 which are vertically disposed, wastewater contacts the carriers 17, 31, and 33.

At this time, the upper parts of the carriers 17, 31, and 33 are in contact with air because they are located in the residential space S, and the lower parts of the carriers 17, 31, and 33 are located in wastewater.

In addition, parts of the carriers 17, 31, and 33 are exposed at boundaries wherein wastewater and air contact.

Therefore, various microbes may be included in the carriers 17, 31, and 33 according to conditions of oxygen concentration and organic material concentration which exist in the entire lengths of the carriers 17, 31, and 33.

In addition, since fluidity of wastewater is improved, it is nearly impossible for sludge to accumulate on the carriers 17, 31, and 33 above a predetermined level, and all biological films attached to the carriers 17, 31, and 33 can be maintained in an aerobic condition. Accordingly, biological treatment for wastewater can be performed at a high speed.

In addition, since the carriers 17, 31, and 33 including microbes are fixedly located in the reactor 10, and biological treatment for wastewater is performed when wastewater contacts the carriers 17, 31, and 33, microbes are prevented from being extruded from the carriers 17, 31, and 33 during the aeration process.

According to conditions for treating microbes, the carriers included in each layer may have the same or different types and amounts. In more detail, the upper layer 16 may have more carriers than the lower layer 12, or vice versa.

Consequently, since biological treatment for wastewater is performed when wastewater contacts the carriers 17, 31, and 33 under various conditions, an exemplary embodiment of the present invention can improve factors for decreasing reaction speed compared to a conventional plant for wastewater treatment.

That is, an exemplary embodiment of the present invention has advantages that a loss of microbes can be prevented and standard oxygen transfer efficiency (SOTE) can be improved. Moreover, reaction between a high concentration of microbes and a low concentration of pollutants, sludge accumulation around carriers, and immediate discharge for intruded wastewater can be prevented according to an exemplary embodiment of the present invention.

On the other hand, escape pipes for air 28, 32, and 36 are connected to one side of the reactor 10, adjacent to the residential space S. Accordingly, when the amount of air gathered in the residential space S is above the predetermined level, the air may be extruded to the outside of the reactor 10 through the escape pipes for air 28, 32, and 36.

When the air is extruded to the outside of the reactor, wastewater in the upper part of the reactor 10 flows into the lower part thereof. Accordingly, bottoms of the sludge separation portions 12, 14, and 16 and exteriors of carriers 17, 31, and 33 can be cleaned by the wastewater flowing into the lower part of the reactor 10.

In addition, a maintaining door D is located at the exterior of the reactor 10. The maintaining door D has the same structure as a commonly well-known door. It is disposed at the corresponding location of sludge separating portions 12, 14, and 16, and it is used when the inside of the reactor 10 needs to be cleaned or the reactor 10 needs to be maintained.

Although wastewater treatment is performed by injecting air into the reactor according to an exemplary embodiment of the present invention, ozone rather than air may be injected into the reactor in order to perform wastewater treatment.

In addition, since the reactor is a PFR (Plug-Flow-Reactor) type wherein fluid flows gradually, processing time of the reactor can be reduced. The PFR type is a reactor wherein high-concentration organic materials, oxygen, and microbes contact one another in the lower part of the reactor, and low-concentration organic materials, oxygen, and microbes contact one another in the upper part of the reactor. Preferably, processing time of the reactor can be reduced by five times or more in comparison with a conventional activated sludge process for wastewater treatment. In addition, efficiency for treating wastewater can be improved 95% or more comparing to a conventional plant for wastewater treatment.

Hereinafter, a biological plant for wastewater treatment according to an exemplary embodiment of the present invention will be described in more detail with reference to the accompanying drawings.

As shown in FIG. 1 to FIG. 4, wastewater flows into the inside of the reactor 10 through the inflow pipe for wastewater 18, and external air is injected into the inside of the reactor 10 through the inflow pipe for air 24.

When wastewater is pumped inside of the reactor 10, it is stored from the bottom of the reactor 10, and when wastewater additionally flows into the inside of the reactor 10, the level of the wastewater gradually goes up. Consequently, a surface of the wastewater is formed in contact with the lower part of the transferring pipe for fluid 26 that is protruded downward from the first sludge separating portion 12.

At this time, air intruded through the inflow pipe for air 24 ascends up to the first sludge separating portion 12, and the air is uniformly dispersed into wastewater during its ascent.

Accordingly, efficiency in treating wastewater can be improved because the amount of dissolved oxygen is increased when the air is dispersed into wastewater.

In addition, wastewater intruded into the reactor 10 passes a plurality of the first carriers 17 disposed at the bottom of the first sludge separating portion 12 until it reaches the first sludge separating portion 12.

Here, when the wastewater contacts the first carriers 17, biological reaction occurs between wastewater and a large amount of the microbes included in the first carriers.

Therefore, wastewater can be purified by the biological reaction between wastewater and the first carriers 17.

The residential space S is formed between a plate 35 and the surface of the wastewater formed in contact with the lower part of the transferring pipe for fluid 26 below the first sludge separating portion 12, and external air is gathered in the residential space S.

Since air in the residential space S is discharged by pressure when it is gathered at more than a predetermined level, wastewater in the upper part of the reactor 10 drops into the lower part thereof in order to fulfill volume of air departed from the residential space S. Therefore, fluidity of wastewater can be improved because wastewater is intensively mingled during the drop.

Consequently, efficiency for treating wastewater can be improved because contacts between wastewater and the first carriers 17 may occur more frequently due to the improvement of fluidity of wastewater.

In addition, fluidity of wastewater can be more improved by discharging air to the outside of the reactor through the escape pipe 38.

The wastewater passing the first sludge separating portion 12 reaches the second sludge separating portion 14.

At this time, a biological reaction occurs at the second sludge separating portion 14 through the same process as in the first sludge separating portion 12.

In other words, the wastewater can be purified by biological reaction between wastewater and a plurality of the second carriers 31 included at the bottom of the second sludge separating portion 14. In addition, the amount of dissolved oxygen can be increased because air is contained in the wastewater during its ascent through the second transferring pipes for fluid 30 and the second through-hole h2.

Wastewater and air pass the third sludge separating portion 16 after passing the second sludge separating portion 14.

At this time, since wastewater and air pass a plurality of the third carriers 33 included in the third sludge separating portion 16, the wastewater can be purified by biological reaction between the wastewater and a plurality of the third carriers 33. In addition, the amount of dissolved oxygen can be increased because air is contained in wastewater during its ascent through the third transferring pipes for fluid 34 and the third through-hole h2.

As described above, wastewater and air sequentially passing the first to third sludge separating portions 12, 14, and 16 may be finally discharged to the outside of the reactor 10 through the escape pipe 38 included at the upper part of the reactor 10.

The biological plant for wastewater treatment according to an exemplary embodiment of the present invention provides an advantage that irresoluble microbial by-products created during long processes can be reduced by shortening processing time, and that the amount of sludge can be reduced by increasing oxidation speed due to sufficient dissolved oxygen.

The following graphs show results for substantial experiments of the biological plant for wastewater treatment according to an exemplary embodiment of the present invention by using food wastewater including high-concentration irresoluble materials.

Figure 5:
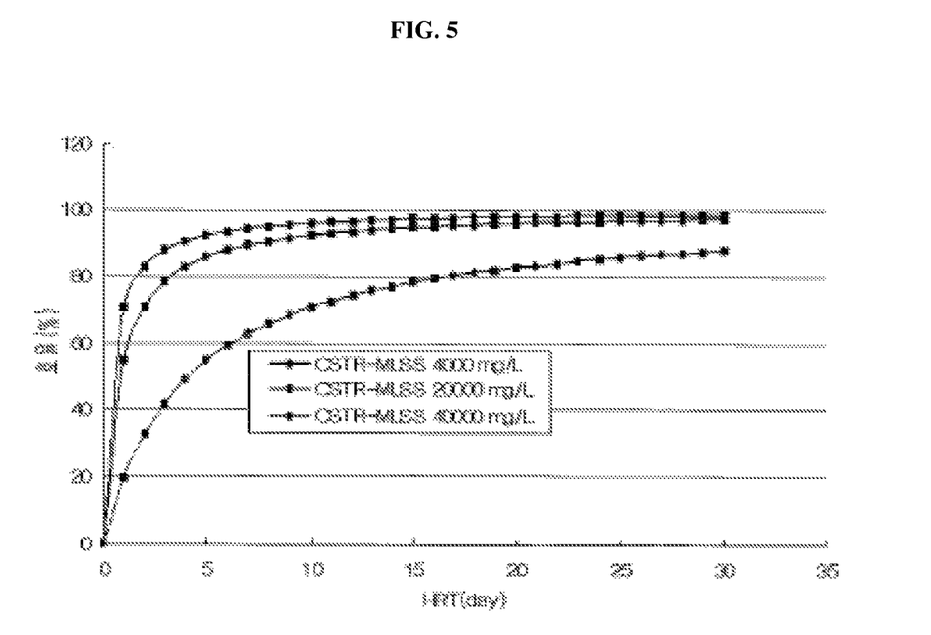
FIG. 5 is a graph of the speed for eliminating organic materials and efficiency for treating wastewater in a continuous-flow stirred-tank reactor (CSTR).

FIG. 5 is a curved line showing efficiency for treating wastewater according to increase of microbes concentration, namely MLSS (mixed liquor suspended solids), in a common continuous-flow stirred-tank reactor (CSTR) representing a conventional technique. Under usual conditions of CSTR, it is nearly impossible to increase MLSS to more than 20,000 mg/L, and although MLSS can be maintained at more than 20,000 mg/L so as to increase speed for treating wastewater, almost ten days is required for treatment wastewater and a much longer time is required for treating wastewater to 99%. Therefore, wastewater treatment in a CSTR may have an intrinsic limit for increasing efficiency.

Figure 6:
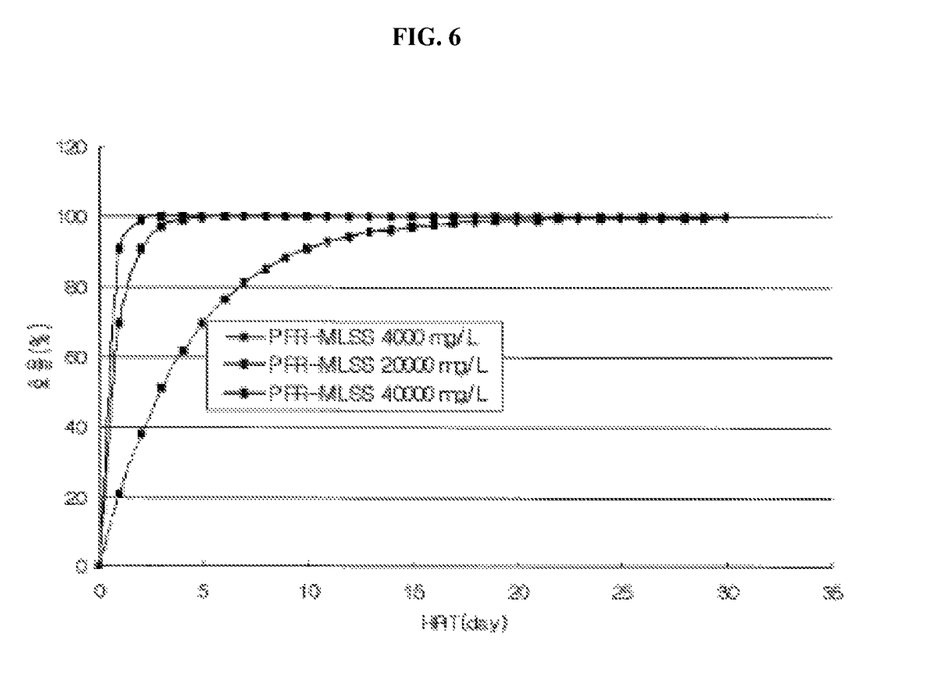
FIG. 6 is a graph of the speed for eliminating organic materials and efficiency for treating wastewater in an ideal plug flow reactor (PFR).

On the other hand, FIG. 6 is a curved line showing speed for eliminating organic materials and efficiency for treating wastewater in a plug flow reactor (PFR). Since efficiency for treating wastewater can be improved up to 100% during a relatively short time, wastewater treatment in a plug flow reactor (PFR) is considered to be a very efficient process. However, since such a PFR is a kind of ideal reactor, it is impossible for such a PFR to be actually realized. Moreover, it is nearly impossible to increase MLSS to more than 20,000 mg/L.

Figure 7:
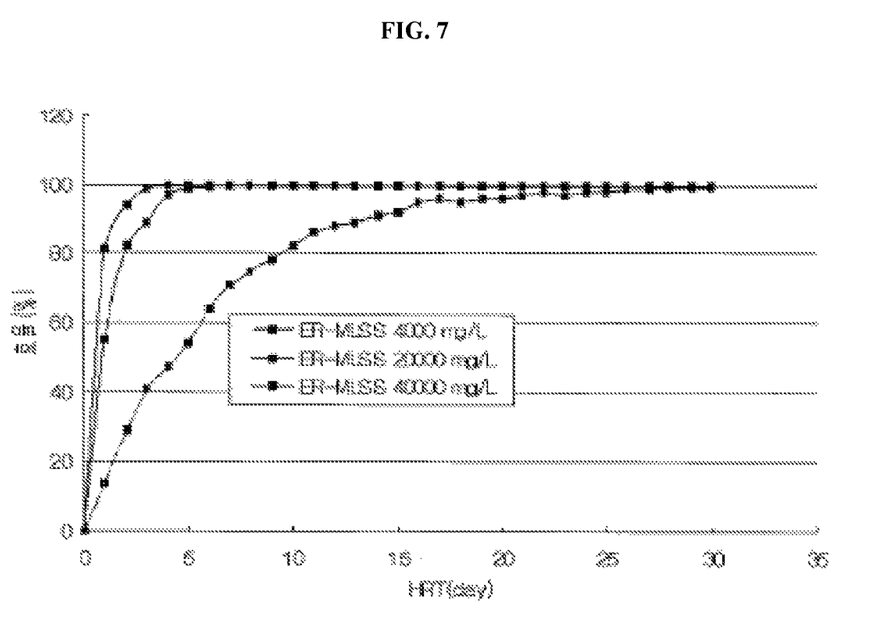
FIG. 7 is a graph of the speed for eliminating organic materials and efficiency for treating wastewater in a reactor according to an exemplary embodiment of the present invention.

FIG. 7 is a curved line showing experimental results of a reactor according to an exemplary embodiment of the present invention. The reactor can simultaneously improve speed for eliminating organic materials and efficiency for treating wastewater. Although a flow of wastewater in a reactor may approximate 60-90% of an ideal PFR according to the number of layers therein, the reactor according to an exemplary embodiment of the present invention shows efficiency for treating wastewater that is nearly the same as or more than an ideal PFR because it can provide several advantages described above, such as movement of sludge, separation of wastewater by density difference of sludge, and higher standard oxygen transfer efficiency (SOTE) at the lower part of the reactor.

INDUSTRIAL APPLICABILITY

The present invention relates to a plant for wastewater treatment. More particularly, the present invention relates to a plant for wastewater treatment where standard oxygen transfer efficiency (SOTE) can be improved by including multi-layer carriers containing biological microbes in a reactor and by increasing fluidity of fluid.

The invention claimed is:

1. A wastewater treatment apparatus that comprises:
a reactor vessel having (a) a lower portion that includes an inflow port, (b) an upper portion that includes an outflow port, and (c) a wall that extends between the lower and upper portions and defines an interior volume of the reactor vessel;
a first separating plate that is positioned in the interior volume of the reactor vessel, and that includes a first plurality of through-holes formed therein;
a second separating plate that is positioned in the interior volume of the reactor vessel between the first separating plate and the upper portion of the reactor vessel, wherein the second separating plate (a) includes a second plurality of through-holes formed therein, and (b) is vertically separated from the first separating plate by a distance $d_1$;
a plurality of transferring pipes coupled to the second separating plate and extending from the second separating plate toward the first separating plate, such that fluid passing through the second plurality of through-holes also passes through the plurality of transferring pipes, wherein the transferring pipes have a length $d_2$, wherein $d_2 < d_1$; and
a plurality of elongate microbe carriers coupled to, and extending between, the first and second separating plates, wherein the plurality of elongate microbe carriers are positioned adjacent to the wall.

2. The apparatus of claim 1, further comprising an escape port formed in the wall between the first and second separating plates, wherein the escape port is vertically separated from the second separating plate by a distance $d_3$, wherein $d_3 < d_2$.

3. The apparatus of claim 1, further comprising a plurality of transferring pipes coupled to the first separating plate and extending from the first separating plate toward the lower portion of the reactor vessel, such that fluid passing through the first plurality of through-holes also passes through the plurality of transferring pipes coupled to the first separating plate.

4. The apparatus of claim 1, wherein at least a portion of the first plurality of through-holes are not vertically aligned with at least a portion of the second plurality of through-holes.

5. The apparatus of claim 1, wherein at least a portion of the plurality of transferring pipes have an upper cross-sectional area that is larger than a lower cross-sectional area.

6. The apparatus of claim 1, wherein at least a portion of the plurality of transferring pipes have a constant cross-sectional area along their length.

7. The apparatus of claim 1, wherein at least one of the plurality of elongate microbe carriers comprises a plurality of ring-shaped elements that are coupled together.

8. The apparatus of claim 1, wherein at least one of the plurality of elongate microbe carriers comprises is welded to the second separating plate.

9. The apparatus of claim 1, wherein at least one of the plurality of elongate microbe carries is coupled to the second separating plate using a bracket.

10. The apparatus of claim 1, wherein at least one of the plurality of elongate microbe carriers has a first composition of microbes in a first region that is a first distance from the second separating plate, and that has a second composition of microbes in a second region that is a second distance from the second separating plate.

11. The apparatus of claim 1, further comprising:
a third separating plate that is positioned in the interior volume of the reactor vessel between the second separating plate and the upper portion of the reactor vessel, wherein the third separating plate includes a third plurality of through-holes formed therein;
a plurality of transferring pipes coupled to the third separating plate and extending from the third separating plate toward the second separating plate, such that fluid passing through the third plurality of through-holes also passes through the plurality of transferring pipes coupled to the third separating plate; and
a second plurality of elongate microbe carriers coupled to, and extending between, the second and third separating plates, wherein the plurality of elongate microbe carries are positioned adjacent to the wall.

* * * * *